(12) United States Patent
Cionca et al.

(10) Patent No.: US 11,662,434 B2
(45) Date of Patent: May 30, 2023

(54) DEPTH SENSOR

(71) Applicant: Ford Global Technologies, LLC, Dearborn, MI (US)

(72) Inventors: Codrin Cionca, Ann Arbor, MI (US); Juan Enrique Castorena Martinez, Southfield, MI (US); Lu Xu, Canton, MI (US); Linjun Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 974 days.

(21) Appl. No.: 16/524,775

(22) Filed: Jul. 29, 2019

(65) Prior Publication Data

US 2021/0033707 A1 Feb. 4, 2021

(51) Int. Cl.
*G01S 7/481* (2006.01)
*G01S 7/48* (2006.01)
*G01S 7/4911* (2020.01)
*G01S 7/484* (2006.01)

(52) U.S. Cl.
CPC .......... *G01S 7/4815* (2013.01); *G01S 7/4802* (2013.01); *G01S 7/484* (2013.01); *G01S 7/4911* (2013.01)

(58) Field of Classification Search
CPC ........ G01S 17/10; G01S 17/42; G01S 17/931; G01S 7/4802; G01S 7/4815; G01S 7/484; G01S 7/4868; G01S 7/4911; G01S 7/4811; G01S 17/32
See application file for complete search history.

(56) References Cited

U.S. PATENT DOCUMENTS

| | | | |
|---|---|---|---|
| 10,031,214 B2 | 7/2018 | Rosenzweig et al. | |
| 10,094,925 B1 | 10/2018 | LaChapelle | |
| 2008/0316026 A1* | 12/2008 | Yenisch | G01S 17/87 340/555 |
| 2015/0219764 A1* | 8/2015 | Lipson | H01S 5/00 356/4.01 |
| 2017/0102212 A1* | 4/2017 | Radl | G01S 7/4815 |
| 2018/0003803 A1 | 1/2018 | Kakani et al. | |
| 2019/0033429 A1* | 1/2019 | Donovan | G01S 17/06 |
| 2019/0170878 A1* | 6/2019 | Munro | H04N 5/238 |
| 2020/0011977 A1* | 1/2020 | Keller | G01S 7/484 |
| 2020/0207252 A1* | 7/2020 | Guidi | G03B 37/00 |
| 2020/0209358 A1* | 7/2020 | Maleki | G01S 7/497 |
| 2020/0361034 A1* | 11/2020 | Mullins | B23K 26/0093 |
| 2022/0163634 A1* | 5/2022 | Gorman | G01S 17/894 |

FOREIGN PATENT DOCUMENTS

WO 2018039249 A1 3/2018

* cited by examiner

*Primary Examiner* — Mohammed S Rahaman
(74) *Attorney, Agent, or Firm* — Frank A. MacKenzie; Bejin Bieneman PLC

(57) ABSTRACT

A system is described. The system includes: a support; a first emitter coupled to the support, facing radially outwardly, and configured to emit a continuous-wave (CW) beam; and a second emitter coupled to the support, facing radially outwardly, and configured to emit a pulsed beam. The system may determine reflectivity using the first emitter and may determine a range using the second emitter.

20 Claims, 4 Drawing Sheets

DEPTH SENSOR

BACKGROUND

Various sensors may employ techniques to determine depth (e.g., also referred to as 'range'). Examples of such sensors include radio detection and ranging (radar), sound navigation and ranging (sonar), and light detection and ranging (lidar, also referred to as laser detection and ranging or ladar).

DETAILED DESCRIPTION

Figure 1:
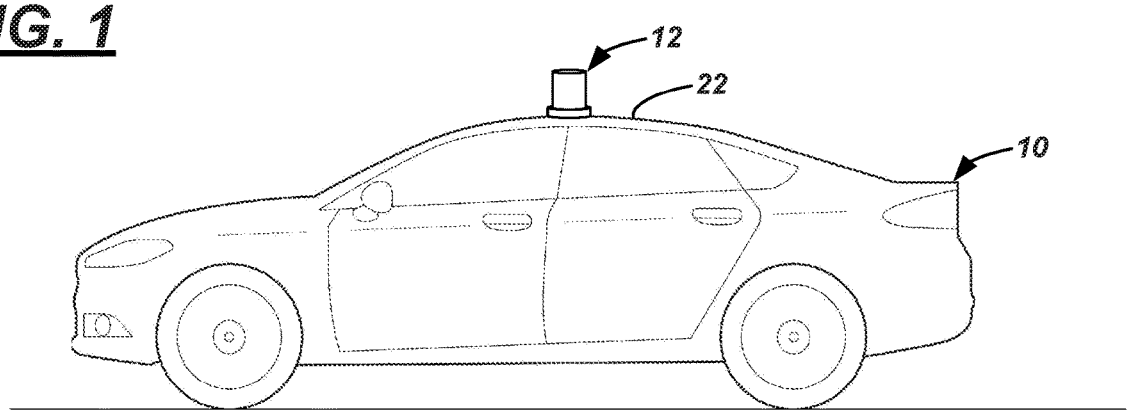
FIG. 1 is a schematic diagram illustrating a vehicle and a sensor.

A sensor system is described herein. The system may include: a support; a first emitter coupled to the support, facing radially outwardly, and configured to emit a continuous-wave (CW) beam; and a second emitter coupled to the support, facing radially outwardly, and configured to emit a pulsed beam. The system may determine reflectivity using the first emitter and may determine a range using the second emitter.

According to the at least one example set forth above, the first emitter is a continuous-wave (CW) laser emitter, wherein the second emitter is a pulsed laser emitter.

According to the at least one example set forth above, the support extends along an axis, wherein the first and second emitters are circumferentially-positioned so that a first optical axis (of the first emitter) is angularly offset with respect to a second optical axis (of the second emitter).

According to the at least one example set forth above, the first and second optical axes diverge.

According to the at least one example set forth above, the support extends along an axis, wherein the first and second emitters are positioned at a common elevation along the axis.

According to the at least one example set forth above, the support extends along an axis of rotation, wherein the first emitter is positioned laterally in a direction of rotation with respect to the second emitter.

According to the at least one example set forth above, the system further comprises: a first receiver coupled to the support and facing radially outwardly; and a second receiver coupled to the support and facing radially outwardly.

According to the at least one example set forth above, the first receiver comprises a first saturation threshold, and the second receiver comprises a second saturation threshold, wherein the second saturation threshold is less than the first saturation threshold.

According to the at least one example set forth above, the system further comprises: a base, wherein the support rotates relative to the base.

According to the at least one example set forth above, the system further comprises: a processor; and memory storing instructions executable by the processor, the instructions comprising, to: actuate the first emitter; and then, actuate the second emitter.

According to the at least one example set forth above, the instructions further comprise to: prior to actuating the second emitter, determine a reflectivity parameter value using the first emitter; and determine a power parameter value based on the reflectivity parameter value.

According to the at least one example set forth above, the instructions further comprise to: change a repetition rate of the second emitter based on the determined power parameter value.

According to the at least one example set forth above, the system further comprises: a first receiver; a second receiver; a processor; and memory storing instructions executable by the processor, the instructions comprising, to: using a return received via the first receiver, determine a power parameter for the second emitter.

According to the at least one example set forth above, the instructions further comprise to: determine a plurality of range measurements using the second emitter and the second receiver; and prior to each determination, update the power parameter by actuating the first emitter.

According to the at least one example set forth above, updating the power parameter comprises changing a repetition rate of the second emitter.

According to another illustrative example, a system is described that comprises: a support; a continuous-wave (CW) laser emitter coupled to the support; a pulsed laser emitter coupled to the support; a processor; and memory storing instructions executable by the processor, the instructions comprising, to: determine a power parameter using the pulsed laser emitter; and then, determine a reflectivity parameter using the CW laser emitter; then, actuate the pulsed laser emitter.

According to the at least one example set forth above, the CW laser emitter and the pulsed laser emitter each face radially outwardly of the support.

According to the at least one example set forth above, the support extends along an axis of rotation, wherein the CW laser emitter is positioned laterally in a direction of rotation with respect to the pulsed laser emitter.

According to the at least one example set forth above, the system further comprises: a first receiver configured to receive a return from the CW laser emitter; and a second receiver configured to receive a return from the pulsed laser emitter.

According to the at least one example set forth above, the system further comprises: a base coupled to the support, wherein the support rotates relative to the base.

According to the at least one example, a computer program product is disclosed that includes a computer readable medium storing instructions executable by a computer processor, wherein the instructions include any combination of the instruction examples set forth above.

Turning now to the FIGS. 1-6, wherein like reference numerals indicate similar or like features or functions, a vehicle 10 comprising a sensor system 12 is shown (i.e., a system capable of determining a range between it and a target object surface in the sensor's environment). As will be described in greater detail below, the sensor system 12 may comprise a plurality of first emitters 14 and a plurality of second emitters 16. During operation, an example first emitter 14 may be used to determine a reflectivity parameter of a region 18 (FIGS. 5-6) of a target object surface 20 (any flat or uneven region of an object). Thereafter, a power parameter for an example second emitter 16 may be determined (and/or adjusted—e.g., increased or decreased). And then using the determined power parameter, the example second emitter 16 may be actuated to determine a range between the sensor system 12 and the region 18. By tuning the power of the emission from the second emitter 16 relative to a value of the reflectivity parameter associated with region 18, the accuracy of sensor system 12 is improved. Accuracy improvement may include, e.g., minimizing the generation of ghosting artifacts.

As will be apparent from the description below, the sensor system 12 may be used in a variety of vehicle and non-vehicle applications. Thus, a vehicle environment is merely one example.

Vehicle 10 is illustrated as a passenger vehicle; however, it could also be a truck, a sports utility vehicle (SUV), a recreational vehicle, a bus, an aircraft, a marine vessel, or the like. In at least one example, vehicle 10 is an automotive vehicle which may operate in a partially or fully autonomous mode.

Sensor system 12—shown mounted to a roof 22 of vehicle 10—may be any suitable depth-detection system (e.g., a range between it and an object or surface thereof). According to at least one example, system 12 comprises a rotatable light detection and ranging (lidar) sensor.

Figure 2:
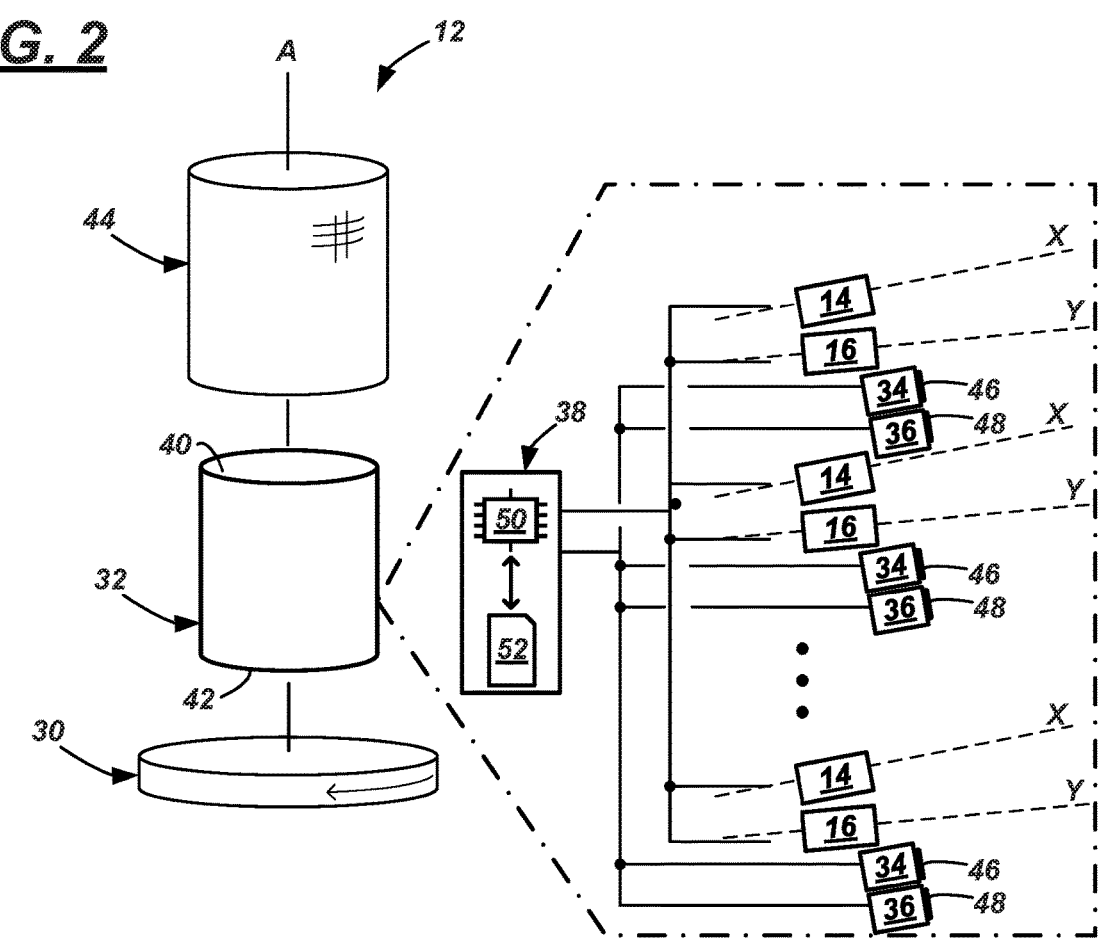
FIG. 2 includes an example of the sensor in an exploded view and an example electrical schematic of the sensor.

Sensor system 12 may comprise a base 30, a support 32 coupled to the base 30, the plurality of first emitters 14 coupled to and carried by the support 32, a plurality of first receivers 34 (which correspond to the plurality of first emitters 14), the plurality of second emitters 16, a plurality of second receivers 36 (which correspond to the plurality of second emitters 16), and a computer 38 which may control the pluralities of first and second emitters 14, 16 and the pluralities of first and second receivers 34, 36 (e.g., FIG. 2 illustrates, in part, an electrical schematic, wherein the illustrated arrangement of emitters 14, 16 and receivers 34, 36 is not intended to convey any particular physical orientation or location of such emitters and receivers on support 32).

Base 30 may comprise any suitable structure by which the support 32 is coupled to vehicle 10 (e.g., or any other object such as infrastructure or the like). In at least one example, base 30 comprises a motor (not shown) and a drive (not shown) which rotate support 32. In some examples, at least a portion of base 30 may rotate. The base 30 is optional—e.g., in some examples, support 32 could be coupled directly to vehicle 10.

Support 32 may be any suitable structure for arranging and supporting the plurality of first emitters 14, the plurality of first receivers 34, the plurality of second emitters 16, and the plurality of second receivers 36. While not required, support 32 may have a cylindrical or other elongated shape (e.g., extending between a first (e.g., upper) end 40 and a second (e.g., lower) end 42). Further, for example, support 32 may have an axis A of rotation which passes through support 32 (and about which base 30 may rotate the support 32).

In some examples, a cover 44 may surround and protect support 32 from environmental elements (e.g., such as temperature, precipitation, wind, etc.). In FIG. 2, the cover 44 has an elongated shape and comprises a hollow region (not shown), wherein a diameter of the cover 44 is slightly larger than a diameter of the support 32 such that the cover 44 may surround support 32, the plurality of first and second emitters 14, 16, and the plurality of first and second receivers 34, 36. The illustrated cover 44 is merely an example; further, cover 44 may have any suitable shape. Still further, in some examples, no cover exists (e.g., cover 44 is optional).

According to one non-limiting example, each of the plurality of first emitters 14 are identical. Therefore, only one first emitter 14 will be described in detail herein.

First emitter 14 may be any suitable electronic device which emits energy (e.g., a beam) along a first optical axis X. According to an example, first emitter 14 emits collimated light energy using one or more non-visible wavelengths (however, one or more visible wavelengths also may be used alternatively or in addition thereto). According to one example, first emitter 14 comprises a light source (e.g., such as a light emitting diode (LED)) configured to emit a continuous-wave (CW) laser (i.e., the first emitter 14 may be a CW laser emitter). For example, first emitter 14 may operate in an CW mode (e.g., steady state).

According to one non-limiting example, each of the plurality of first receivers 34 are identical. Therefore, only one first receiver 34 will be described in detail herein.

First receiver 34 may be any suitable electronic device that detects a return (e.g., a 'CW return') and transduces the return into an electrical signal. As used herein, a return refers to energy which is emitted from an emitter and reflected off of a surface of a physical object, wherein at least a portion of that energy is directed to the receiver. In at least one example, the return is in the form of light energy. According to an example, first receiver 34 includes an energy-sensing element 46 which is responsive to a return within a predetermined bandwidth of frequencies (e.g., emitted by first emitter 14). For example, the first receiver 34 may comprise a notch filter or the like. Non-limiting examples of second receiver 36 are an avalanche photodiode or a single photon avalanche diode; other examples exist. Further, first receiver 34 may be configured such that when light reflects off of surface 20 with a relatively high reflectivity and then strikes element 46, it does not saturate the element 46; i.e., the light energy absorbed by the element 46 does not exceed a predetermined saturation threshold thereof. Saturation, e.g., refers to when such an energy-sensing element reaches a maximum level at which the input (e.g., light) can no longer be reliably measured.

According to one non-limiting example, each of the plurality of second emitters 16 are identical. Therefore, only one second emitter 16 will be described in detail herein.

Second emitter 16 may be any suitable electronic device which emits energy (e.g., a beam) along a second optical axis Y (which may be angularly offset with respect to the first optical axis X). According to an example, second emitter 16 emits collimated light energy using one or more non-visible wavelengths (however, one or more visible wavelengths also may be used alternatively or in addition thereto). At least one center frequency of energy emitted by second emitter 16 may differ from a center frequency of first emitter 14. In this manner, receiver cross-talk and/or interference may be minimized. According to one example, second emitter 16 comprises a light element (e.g., such as a light emitting diode (LED)) configured to emit a pulsed laser (i.e., the second emitter 16 may be a pulsed laser emitter). In the context of the present disclosure, a pulsed laser emitter may have a repetition rate of approximately 50000 Hertz (Hz). According to at least one example, a power parameter of the second emitter 16 may be tuned by changing the repetition rate of the second emitter 16.

According to one non-limiting example, each of the plurality of second receivers 36 are identical. Therefore, only one second receiver 36 will be described in detail herein.

Second receiver 36 may be any suitable electronic device that detects a return (e.g., a 'pulsed return;' e.g., light) and transduces the return into an electrical signal. According to an example, second receiver 36 includes an energy-sensing element 48 which is responsive to a return within a predetermined bandwidth of frequencies (e.g., emitted by second emitter 16). Typically, the second receiver 36 comprises a notch filter (enabling it to filter out frequencies not emitted by second emitter 16). One non-limiting example of second receiver 36 is an avalanche photodiode (APD); other examples exist. The second receiver 36 also may have a predetermined saturation threshold; according to at least one example, the saturation threshold of the second receiver 36 is less than the saturation threshold of the first receiver 34.

Figure 3:
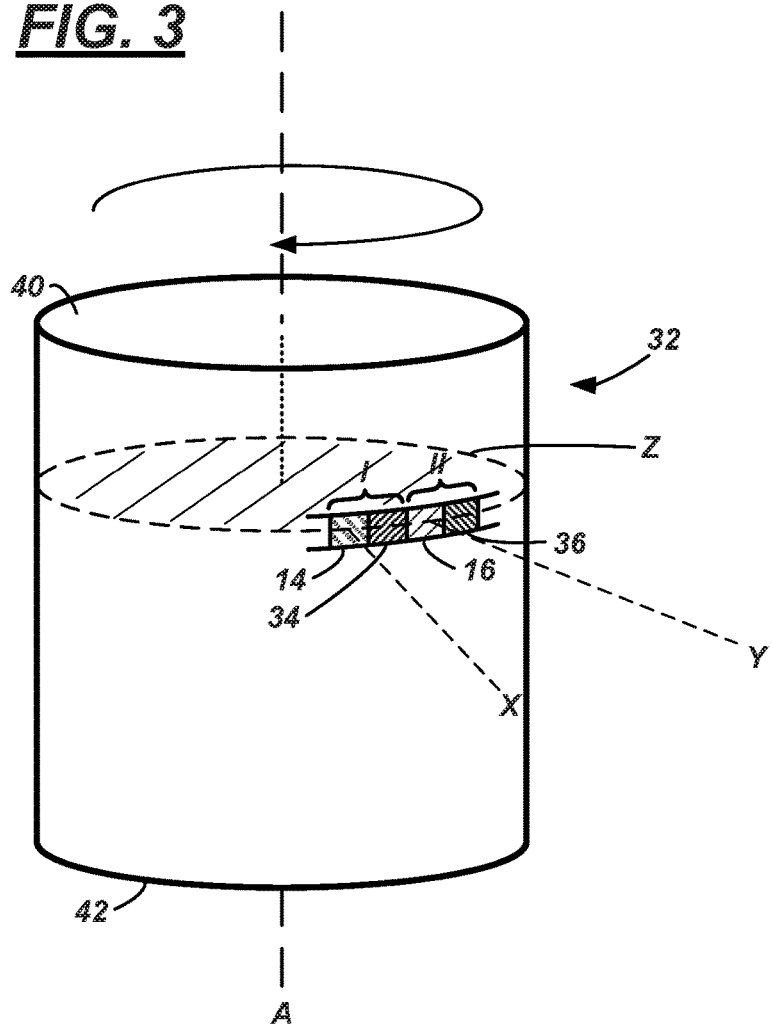
FIG. 3 is a perspective view of a support of the sensor and an example position and orientation of a first emitter, a second emitter, a first receiver, and a second receiver.
Figure 4:
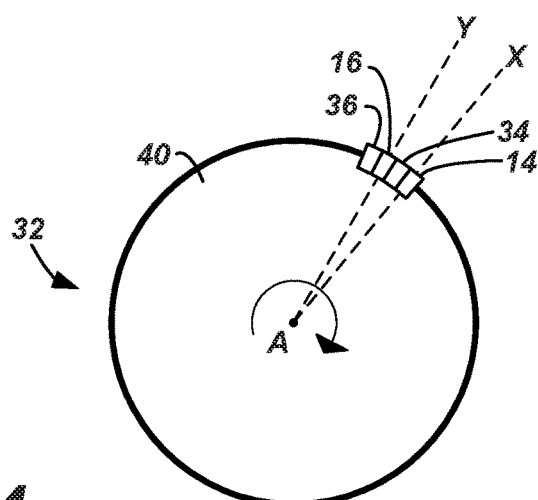
FIG. 4 is a top view of the support shown in FIG. 3.
Figure 5:
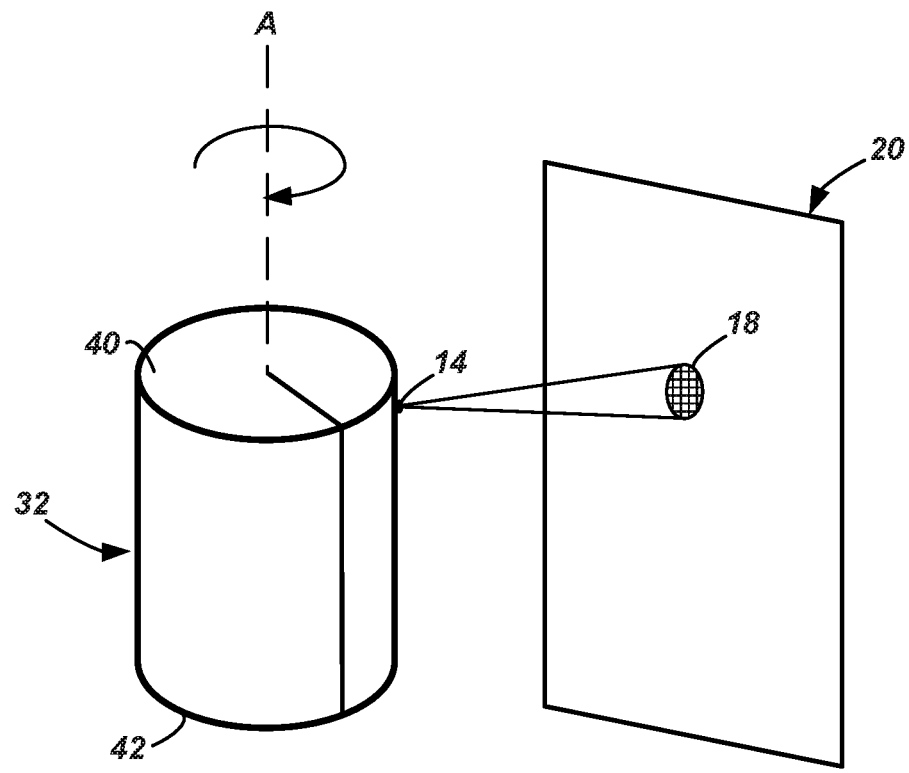
FIG. 5 illustrates the first emitter of the sensor emitting energy towards a target object surface.
Figure 6:
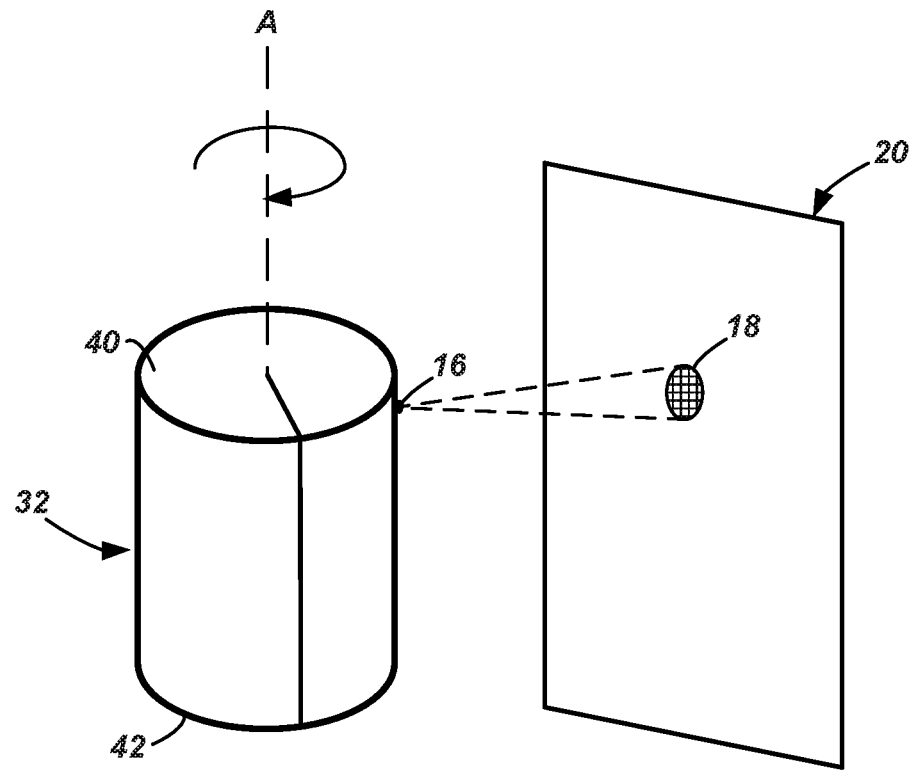
FIG. 6 illustrates the second emitter of the sensor emitting energy towards the target object surface.

FIG. 3 illustrates a non-limiting example of a portion of an arrangement of the plurality of first emitters 14, the plurality of first receivers 34, the plurality of second emitters 16, and the plurality of second receivers 36 (only one of each is shown for sake of simplicity). As shown, first emitter 14, first receiver 34, second emitter 16, and second receiver 36 may be circumferentially-positioned on and fixedly-coupled to support 32, wherein each of the first and second emitters 14, 16 and first and second receivers 34, 36 face radially-outwardly, wherein, e.g., the first optical axis X of first emitter 14 diverges from the second optical axis Y of second emitter 16 (see also FIG. 4 illustrated that if the axes X, Y are extended radially inwardly, they may be considered to intersect). Further, according to the illustrated example, emitters 14, 16 are located at a common (vertical) elevation along axis A (e.g., emitters 14, 16 may be equally spaced from either of first and/or second ends 40, 42); in at least some examples (e.g., see FIG. 3), the emitters 14, 16 and receivers 34, 36 also are positioned within a plane Z, wherein plane Z is perpendicular to the axis A of rotation. Further, as shown in FIGS. 3-4, the first emitter 14 may be positioned laterally with respect to the second emitter 16, wherein the first emitter 14 is in a direction of rotation (e.g., clockwise) relative to the second emitter 16. Similarly, as shown in the figures, the first receiver 34 may be positioned laterally with respect to the second receiver 36, wherein the first receiver 34 is in the clockwise direction of rotation relative to the second receiver 36. More particularly, in at least one example, in a clockwise (and circumferential) manner, the emitters and receivers may be arranged according to the following order: the second receiver 36, the second emitter 16 (proximate or adjacent to second receiver 36), the first receiver 34 (proximate or adjacent to second emitter 16), and the first emitter 14 (proximate or adjacent to first receiver 34). As will be explained more below, in this manner, when the support 32 is rotated in the clockwise direction of rotation, the first emitter 14 (e.g., the CW laser emitter) may emit energy which strikes region 18 of target object surface 20; then, second emitter 16 (e.g., the pulsed laser emitter) may emit energy which strikes the region 18 thereafter. It should be appreciated that a clockwise direction of rotation is merely an example (the pluralities of emitters and receivers could be arranged in a counterclockwise arrangement instead, wherein the direction of rotation also would be counterclockwise, etc.).

First emitter 14 and first receiver 34 may be referred to as a pair I for measuring reflectivity. That is, the first emitter 14 may be positioned and coupled to support 32 such that light emitted along first optical axis X may be received by first receiver 34. Similarly, second emitter 16 and second receiver 36 may be referred to as a pair II for measuring range. That is, the second emitter 16 may be positioned and coupled to support 32 such that light emitted along second optical axis Y may be received by second receiver 36. And such a pair I and a pair II may be referred to herein as a set.

While FIGS. 3-4 show only one set (i.e., one pair (I) for measuring reflectivity and one pair (II) for measuring range), it should be appreciated that numerous such sets may be coupled to support 32, wherein each set may be similarly circumferentially-positioned (e.g., 360° around the support 32), wherein at least some of the sets are spaced from first end 40 differently than others.

Returning to FIG. 2, computer 38 may be any suitable computing device, circuit card, electronic control unit (ECU), digital and/or analog circuitry, etc. that controls actuation of the plurality of first and second emitters 14, 16, that controls operation of the plurality of first and second receivers 34, 36, that determines reflectivity and power parameters (as discussed below), and that determines a plurality of range measurements relative to the sensor system 12 (e.g., often referred to as a point cloud).

According to an example, computer 38 comprises one or more processors 50 and memory 52. Processor(s) 50 may be any type of device capable of processing electronic instructions, non-limiting examples including a microprocessor, a microcontroller or controller, an application specific integrated circuit (ASIC), etc.—just to name a few. In at least one example, processor(s) 50 may be programmed to execute digitally-stored instructions, which may be stored in memory 52, which enable the computer 38 to determine a reflectivity parameter for pair I (first emitter 14 and first receiver 34) and then (when desirable) adjust a power parameter for corresponding pair II—so that a more accurate range measurement may be determined. Non-limiting examples of instructions will be described in the one or more processes described below, wherein (unless specified) the order of the instructions set forth below is merely an example.

Memory 52 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 52 may store one or more computer program products which may be embodied as software, firmware, or other programming instructions executable by the processor(s) 50. In addition, memory 52 may store the data associated with an operation of sensor system 12, as described more below.

FIG. 2 illustrates that computer 38 may be discretely connected to each of the plurality of first emitters 14, each of the plurality of first receivers 34, each of the plurality of second emitters 16, and each of the plurality of second receivers 36. This is merely an example; other implementations exist as well (e.g., including data bus implementations).

Figure 7:
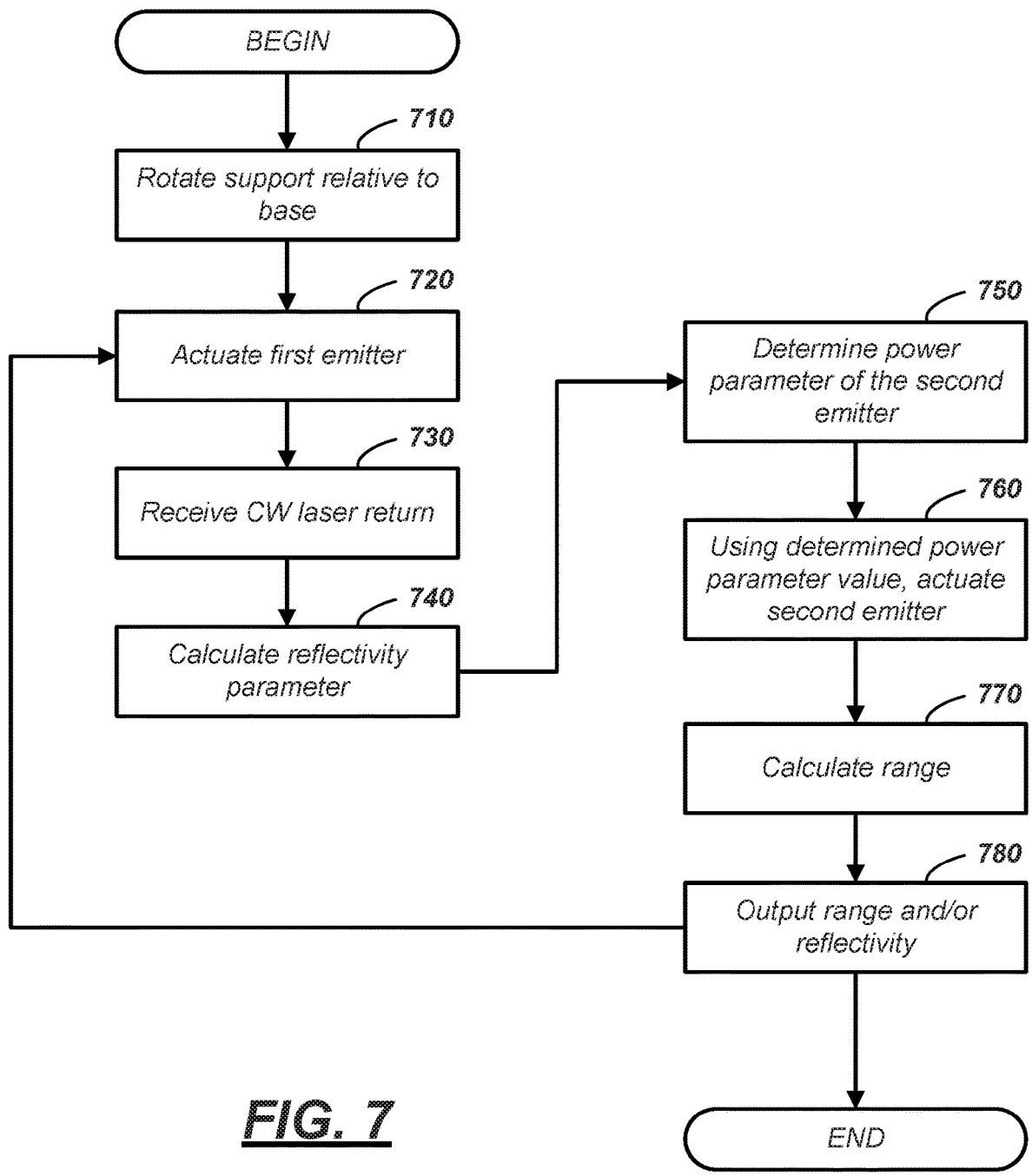
FIG. 7 is a flow diagram illustrating a process for first determining a reflectivity of the target object surface and then determining a range between the sensor and the target object surface.

Now turning to FIG. 7, one example of a process 700 is illustrated for using sensor system 12. While other examples are contemplated, in at least example, the sensor system 12 comprises a lidar; thus, emitters 14, 16 emit light energy and receivers 34, 36 detect returns of said light energy. For sake of simplicity, process 700 is described with respect to a single set (e.g., one pair I and one corresponding pair II). It should be appreciated process 700 could be executed for multiple sets operating concurrently—e.g., wherein respective first and second emitters 14, 16 are emitting collimated light energy in different directions at least partially concurrently, wherein respective corresponding first and second receivers 34, 36 are receiving corresponding returns from their respective emitters 14, 16 (again, at least partially concurrently). The process 700 begins with block 710.

In block 710, computer 38 may control sensor system 12 so that support 32 rotates relative to base 30 in a predetermined direction of rotation (e.g., clockwise). E.g., as described above, this may include computer 38 actuating a motor which in turn rotates a drive thereby rotating support 32 about axis A in a direction of rotation (e.g., for purposes of this example, in a clockwise direction). During process 700, rotation of support 32 (e.g., block 710) may occur concurrently to the execution of any of the remaining blocks 720-780.

According to at least one example, the rotational speed of the support 32 corresponds with a computational time of at least some blocks of process 700. For example, as described below, the time that is required to compute a reflectivity parameter (using data from first receiver 34 and then control an actuation of the second emitter 16) may correspond with an angular amount of rotation of support 32 so that a beam from first emitter 14 (once aimed at region 18 of target object surface 20) now corresponds with a beam from second emitter 16 being presently aimed at the same region 18.

In block 720, computer 38 may actuate first emitter 14 which—in at least this example—is a CW laser emitter. Thus, a collimated and continuous-wave light emission may be directed along first optical axis X to exemplary region 18 of target object surface 20.

In block 730 which follows, a return (of first emitter 14) may be received via first receiver 34; i.e., at least a portion of light energy that was reflected from region 18 may be received at first receiver 34.

In block 740 which follows, computer 38 may determine a reflectivity parameter of region 18. It should be appreciated that the amount of reflection received at first receiver 34 from any surface may vary based on a number of factors (e.g., material of target object surface, visibility, optical noise, etc.). According to one example, determining the reflectivity parameter includes determining a ratio of emitted light energy ($G_i$) from first emitter 14 to received light energy ($G_r$) at first receiver 34 (namely, it may determining include $$\frac{G_r}{G_i}\Big).$$

In some examples, calculating the reflectivity parameter may include other mathematical factors (e.g., multiplying constants, other variables, correction factors, etc.).

In block 750, computer 38 may determine—based on the reflectivity parameter—a suitable power parameter to use before actuating the second emitter 16. According to one example, computer 38 may use a look-up table stored in memory 52. For example, the look-up table may comprise an array of corresponding values—e.g., different power parameter values that correspond to ranges of reflectivity parameter thresholds. According to an example, the larger the calculated value of the reflectivity parameter, the smaller the value of the corresponding power parameter. Table I is illustrative (wherein value a10>value a9, wherein value a9>value a8, . . . , wherein value a2>value a1).

TABLE I

| Reflectivity Parameter Thresholds | Power Parameter |
|---|---|
| <10% | a10 |
| 10-20% | a9 |
| 20-30% | a8 |
| 30-40% | a7 |
| 40-50% | a6 |
| 50-60% | a5 |
| 60-70% | a4 |
| 70-80% | a3 |
| 80-90% | a2 |
| >90% | a1 |

More or fewer corresponding power parameter values may be used. Similarly, the percentile ranges of reflectivity parameter values may differ in other examples. Still further, values a1 to a10 may or may not be linear.

In block 760 which follows, computer 38 may actuate the second emitter 16 using the determined power parameter value. Thus, block 760 may include increasing a power level of the second emitter 16, decreasing the power level thereof, or determining to not change the power level. In at least one example, the power level is increased by increasing a repetition rate of the second emitter 16 or decreased by decreasing the repetition rate of the second emitter 16. Upon actuation, pulsed light from second emitter 16 may at least partially overlap region 18 of surface 20 and then reflect back to be received by second receiver 36.

In block 770, computer 38 may determine a range n between the region 18 and the sensor system 12 using a time-of-flight (ToF) calculation (shown in Equation 1) using an initial time ($t_0$) and time of return ($t_R$) and the speed of light.

$$n = c*(t_R - t_0), \text{ wherein } c \text{ is the speed of light} \qquad \text{Equation 1.}$$

By using a suitable power parameter value during actuation of the second emitter 16, accuracy of the sensor system 12 may be improved. In at least some examples, ghosting artifacts are reduced thereby minimizing repeating measurements for a common region 18 in order to ensure accuracy. In operation, reduction of ghosting artifacts may be directly correlated to determining a suitable power parameter value for the second emitter 16 that corresponds to the reflectivity of region 18 (of the target object surface 20).

Based on the description above, it should be appreciated that resources of the computer 38 are not used inefficiently either—e.g., requiring multiple measurements from a common surface region before the computer 38 can reliably determine with accuracy the respective range.

In block 780 which follows, computer 38 may output the range (e.g., to a vehicle computer or other device (e.g., not shown)), a value of the reflectivity parameter, or both.

Following block 780, the process 700 typically loops back and repeats blocks 720-780 (e.g., during rotation of the support 32). Of course, if the sensor system 12 is controlled to an OFF state or is unpowered, then process 700 may end.

As discussed above, the illustrated arrangement of pairs I, II is merely one example. Other examples exist where the pairs I, II can be arranged on support 32 differently. For example, the optical axes of the respective emitters may be arranged differently if pair I was closer to first end 42 than pair II (or the like) provided that for any given target region (e.g., such as region 18) first emitter 14 is actuated to determine a respective reflectivity parameter value and that second emitter 16 is actuated to reflect off of substantially the same region 18 (at a power level that is based on the instant value of the reflectivity parameter determined using pair I).

Thus, there has been described a sensor system that includes two emitters having different modes of operation. Using one of the emitters, a reflectivity parameter may be determined by the sensor system. And then the sensor system may utilize that reflectivity parameter to determine a power level for the second emitter. Subsequently, the sensor system may actuate the second emitter at the determined power level in order to achieve greater sensor system accuracy.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
   a support;
   a first emitter coupled to the support, facing radially outwardly, and configured to emit a continuous-wave (CW) beam; and
   a second emitter coupled to the support, facing radially outwardly, and configured to emit a pulsed beam, wherein a repetition rate of the second emitter is changed based on a power parameter value determined using the first emitter; wherein the first emitter is actuated, and then the second emitter is actuated, and wherein prior to actuating the second emitter, a reflectivity parameter value is determined using the first emitter to determine the power parameter value based on the reflectivity parameter value.

2. The system of claim 1, wherein the first emitter is a continuous-wave (CW) laser emitter, wherein the second emitter is a pulsed laser emitter.

3. The system of claim 1, wherein the support extends along an axis, wherein the first and second emitters are circumferentially-positioned so that a first optical axis (of the first emitter) is angularly offset with respect to a second optical axis (of the second emitter).

4. The system of claim 3, wherein the first and second optical axes diverge.

5. The system of claim 1, wherein the support extends along an axis, wherein the first and second emitters are positioned at a common elevation along the axis.

6. The system of claim 5, wherein the support extends along an axis of rotation, wherein the first emitter is positioned laterally in a direction of rotation with respect to the second emitter.

7. The system of claim 1, further comprising:
   a first receiver coupled to the support and facing radially outwardly; and
   a second receiver coupled to the support and facing radially outwardly.

8. The system of claim 7, wherein the first receiver comprises a first saturation threshold, and the second receiver comprises a second saturation threshold, wherein the second saturation threshold is less than the first saturation threshold.

9. The system of claim 1, further comprising a base, wherein the support rotates relative to the base.

10. The system of claim 1, further comprising:
    a first receiver;
    a second receiver;
    a processor; and
    a memory storing instructions executable by the processor, the instructions comprising, to: using a return received via the first receiver, determine the power parameter for the second emitter.

11. The system of claim 10, wherein the instructions further comprise to:
    determine a plurality of range measurements using the second emitter and the second receiver; and
    prior to each determination, update the power parameter by actuating the first emitter.

12. The system of claim 11, wherein updating the power parameter comprises changing a repetition rate of the second emitter.

13. A system, comprising:
    a support;
    a continuous-wave (CW) laser emitter coupled to the support;
    a pulsed laser emitter coupled to the support;
    a processor; and
    a memory storing instructions executable by the processor, the instructions comprising, to:
    determine a reflectivity parameter using the CW laser emitter; then,
    determine a power parameter using the pulsed laser emitter wherein determining the power parameter comprises changing a repetition rate of the pulsed emitter; and then,
    actuate the pulsed laser emitter; wherein prior to actuating the pulsed emitter, determine the reflectivity parameter value using the CW laser emitter; and determine the power parameter value based on the reflectivity parameter value.

14. The system of claim 13, wherein the CW laser emitter and the pulsed laser emitter each face radially outwardly of the support.

15. The system of claim 13, wherein the support extends along an axis of rotation, wherein the CW laser emitter is positioned laterally in a direction of rotation with respect to the pulsed laser emitter.

16. The system of claim 13, further comprising: a first receiver configured to receive a return from the CW laser emitter; and a second receiver configured to receive a return from the pulsed laser emitter.

17. The system of claim 13, further comprising: a base coupled to the support, wherein the support rotates relative to the base.

18. The system of claim 13, wherein the support extends along an axis, wherein the CW and pulsed emitters are circumferentially-positioned so that a first optical axis (of the CW emitter) is angularly offset with respect to a second optical axis (of the pulsed emitter).

19. The system of claim 18, wherein the first and second optical axes diverge.

20. The system of claim 13, wherein the support extends along an axis, wherein the CW and pulsed emitters are positioned at a common elevation along the axis.

* * * * *